United States Patent
Park et al.

(10) Patent No.: US 9,622,114 B2
(45) Date of Patent: Apr. 11, 2017

(54) METHOD FOR LOAD BALANCING USING MULTIPLE INTERFACES AND APPARATUS THEREFOR

(71) Applicant: ELECTRONICS & TELECOMMUNICATIONS RESEARCH INSTITUTE, Daejeon (KR)

(72) Inventors: Pyung Koo Park, Daejeon (KR); Geon Tae Park, Seoul (KR); Jung Sik Kim, Daejeon (KR); Sung Back Hong, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

(21) Appl. No.: 14/623,195

(22) Filed: Feb. 16, 2015

(65) Prior Publication Data
US 2015/0237526 A1 Aug. 20, 2015

(30) Foreign Application Priority Data
Feb. 17, 2014 (KR) .................. 10-2014-0017659

(51) Int. Cl.
*H04W 28/08* (2009.01)

(52) U.S. Cl.
CPC .................. *H04W 28/08* (2013.01)

(58) Field of Classification Search
None
See application file for complete search history.

(56) References Cited

U.S. PATENT DOCUMENTS

| | | | |
|---|---|---|---|
| 8,848,608 B1* | 9/2014 | Addepalli | H04W 4/046 370/328 |
| 2010/0202358 A1* | 8/2010 | Wu | H04L 12/5692 370/328 |
| 2012/0092130 A1* | 4/2012 | Chung | G08B 13/2462 340/10.1 |
| 2013/0191906 A1 | 7/2013 | Park et al. | |
| 2014/0355437 A1* | 12/2014 | Damodaran | H04W 28/16 370/232 |

FOREIGN PATENT DOCUMENTS

| | | |
|---|---|---|
| KR | 1020070083477 A | 8/2007 |
| KR | 1020080050242 A | 6/2008 |
| KR | 1020110136485 A | 12/2011 |

* cited by examiner

*Primary Examiner* — Christine Duong
(74) *Attorney, Agent, or Firm* — Ladas & Parry LLP

(57) ABSTRACT

Disclosed are a method and apparatus for load balancing by using multiple interfaces. The load balancing method using multiple interfaces and performed by the load balancing apparatus includes acquiring information about a plurality of wireless communication interfaces supported by a terminal, measuring transport qualities of the plurality of wireless communication interfaces, calculating data transfer rates of the plurality of wireless communication interfaces based on the transport qualities, and simultaneously transporting data based on the transfer rates through the plurality of wireless communication interfaces.

16 Claims, 11 Drawing Sheets

| TERMINAL ADDRESS | SOURCE PORT | DESTINATION PORT | SOURCE ADDRESS | DESTINATION ADDRESS | INTERFACE NUMBER |
|---|---|---|---|---|---|
| h1 | | | | | FIRST INTERFACE |
| h2 | | | | | |
| h3 | | | | | |
| h4 | | | | | |
| h5 | | | | | |
| ⋮ | | | | | |
| hn | | | | | |

METHOD FOR LOAD BALANCING USING MULTIPLE INTERFACES AND APPARATUS THEREFOR

CLAIM FOR PRIORITY

This application claims priority to Korean Patent Application No. 2014-0017659 filed on Feb. 17, 2014 in the Korean Intellectual Property Office (KIPO), the entire contents of which are hereby incorporated by reference.

BACKGROUND

1. Technical Field

Example embodiments of the present invention relate in general to a method for interface load balancing, and more specifically to a method for balancing loads based on qualities of multiple interfaces.

2. Related Art

A tunnel-based mobility support service allows a user to access an Internet core network through various access networks. A tunnel-based mobility support service terminal and gateway are provided with multiple interfaces allowing access to various access networks. The tunnel-based mobility support service terminal and gateway perform a network access authentication through the access network, and when the authentication is completed, is assigned an IP address to establish a single active tunnel to a mobility convergence control server.

The tunnel-based mobility support service terminal and gateway select an interface having the best quality among multiple interfaces as the active tunnel. In addition, the service terminal and gateway set a single standby tunnel for mobility support.

In this case, the service terminal and gateway transport data by using the active tunnel, and does not use the standby tunnel in actual data transport.

Meanwhile, the service terminal and gateway transport data by using only the single active tunnel/single standby tunnel established to the mobility control server, and thus has a poor efficiency in network use in a network environment which is shared by a plurality of users, for example, in an environment having a mobile router.

In addition, since a plurality of users access the Internet core network through access networks by using a single active interface, a load occurs in the interface being used.

SUMMARY

Accordingly, example embodiments of the present invention are provided to substantially obviate one or more problems due to limitations and disadvantages of the related art.

Example embodiments of the present invention provide a method for load balancing using multiple interfaces, capable of balancing loads of multiple interfaces based on data transport qualities of the multiple interfaces.

Example embodiments of the present invention also provide an apparatus for balancing loads using multiple interfaces, capable of performing the method for load balancing.

In some example embodiments, a method for load balancing by using multiple interfaces, which is performed by a terminal, includes: acquiring information about a plurality of wireless communication interfaces supported by the terminal; measuring transport qualities of the plurality of wireless communication interfaces; calculating data transfer rates of the plurality of wireless communication interfaces based on the transport qualities; and simultaneously transporting data based on the transfer rates through the plurality of wireless communication interfaces.

The transport quality may be determined based on a signal strength, a round trip time, and a transfer weight value of the wireless communication interface.

The signal strength may be determined by converting the signal strength, which is different depending on the type of the wireless communication interface, into a percentage.

The transfer weight value may be determined based on a ratio of a maximum transport speed of the wireless communication interface to a transport speed of a wired communication interface.

The simultaneously transporting of data based on the transfer rates may include: determining a wireless communication interface having a highest transfer rate among the wireless communication interfaces as an active interface; determining wireless communication interfaces except for the active interface as standby interfaces; and simultaneously transporting the data through the determined active interface and the determined standby interfaces.

The simultaneously transporting of data based on the transfer rates may include: determining one of a transport scheme based on a packet to be transported by a client, a transport scheme based on a transport packet for each service flow, and a transport scheme in which all packets are transported while divided based on the transfer rates; determining wireless communication interfaces to transport the data, based on the determined transport scheme and the data transfer rates; and simultaneously transporting the data through the determined wireless communication interfaces.

In the determining of the wireless communication interfaces to transport the data, if the transport scheme based on a packet to be transported by a client is determined, the wireless communication interfaces to transport packets to be transported by respective clients may be determined to match the data transfer rates.

In the determining of the wireless communication interfaces to transport the data, if the transport scheme based on the transport packet for each service flow is determined, the wireless communication interfaces to transport packets for respective service flows may be determined to match the data transfer rates.

In the determining of the wireless communication interfaces to transport the data, if the transport scheme in which all packets are transported while divided based on the transfer rates is determined, the wireless communication interfaces to transport the all packets may be determined to match the data transfer rates.

The method may further include: stopping, if a movement of the terminal is sensed, transporting the data; transporting data which has been stopped with the transport, only through the active interface; and recalculating the data transfer rates of the wireless communication interfaces.

In other example embodiments, an apparatus for balancing loads by using multiple interfaces includes a processing unit and a storage unit. The processing unit may be configured to acquire information about a plurality of wireless communication interfaces supported by the load balancing apparatus, measure transport qualities of the plurality of wireless communication interfaces, calculate data transfer rates of the plurality of wireless communication interfaces based on the transport qualities, and simultaneously transport data based on the transfer rates through the plurality of wireless communication interfaces. The storage unit may be configured to store information having been processed by the processing unit and information to be processed by the processing unit.

The transport quality may be determined based on a signal strength, a round trip time, and a transfer weight value of the wireless communication interface.

The signal strength may be determined by converting the signal strength, which is different depending on a type of the wireless communication interface, into a percentage.

The transfer weight value may be determined based on a ratio of a maximum transport speed of the wireless communication interface to a transport speed of a wired communication interface.

The processing unit may determine a wireless communication interface having a highest transfer rate among the wireless communication interfaces as an active interface; determine wireless communication interfaces except for the active interface as standby interfaces; and simultaneously transport the data through the determined active interface and the determined standby interfaces.

The processing unit may determine one of a transport scheme based on a packet to be transported by a client, a transport scheme based on a transport packet for each service flow, and a transport scheme in which all packets are transported while divided based on the transfer rates, may determine wireless communication interfaces to transport the data, based on the determined transport scheme and the data transfer rates, and may simultaneously transport the data through the determined wireless communication interfaces.

The processing unit may determine, if the transport scheme based on a packet to be transported by a client is determined, the wireless communication interfaces to transport packets to be transported by respective clients to match the data transfer rates.

The processing unit may determine, if the transport scheme based on the transport packet for each service flow is determined, the wireless communication interfaces to transport packets for respective service flows to match the data transfer rates.

If the transport scheme in which all packets are transported while divided based on the transfer rates is determined, the processing unit may determine the wireless communication interfaces used to transport the all packets to match the data transfer rates.

The processing unit may stop, if a movement of the terminal is sensed, transporting the data, transport data, which has been stopped with the transport, only through the active interface, and recalculate the data transfer rates of the wireless communication interfaces.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. In the following description, the same reference numerals will be assigned to the parts of the present embodiments that are identical to those according to the previous embodiment, and details of parts will be omitted in order to avoid redundancy.

In the following specification, a terminal may include multiple interfaces, and the interface may represent a network device used to access a public network, for example, Ethernet, 2G, 3G, WiMax, and Long Term Evolution (LTE).

In addition, the terminal may represent a device capable of performing an Internet protocol (IP) communication, for example, a smart phone and a personal computer (PC), and may represent a mobile gateway device capable of serving as a mobile router.

Figure 1:
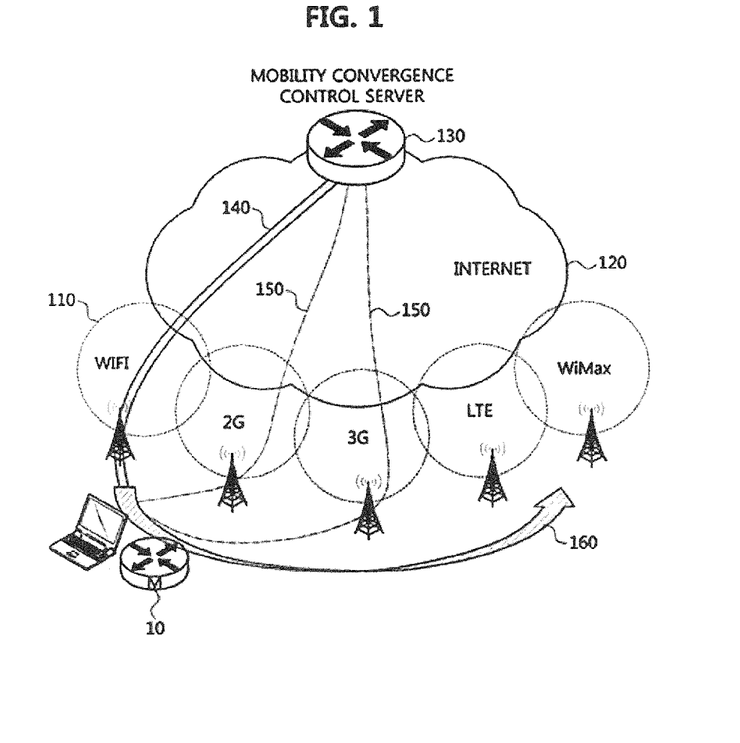
FIG. 1 is a conceptual diagram illustrating a mobility support service using multiple interfaces.

FIG. 1 is a conceptual diagram illustrating a mobility support service using multiple interfaces.

A user may access an Internet core network 120 through various access networks 110, for example, WiFi, 2G, 3G, LTE, and Wimax.

A terminal 10 may include multiple communication interfaces allowing access to the various access networks 110. The terminal 10 may perform a network access authentication through the access network 110, and after the authentication is completed, may be assigned an IP address.

Thereafter, the terminal 10 may establish an active tunnel 140 to a mobility convergence control server 130. The terminal 10 may establish, as the active tunnel, a communication interface having the best quality among the multiple interfaces included in the terminal 10.

In addition, the terminal 10 may additionally establish a standby tunnel 150 to the mobility convergence control server 130 to support mobility 160 of the terminal 10.

The terminal 10 may transport data by using the active tunnel 140, and does not use the standby tunnel 150 that is established to support the mobility of the terminal 10.

Figure 2:
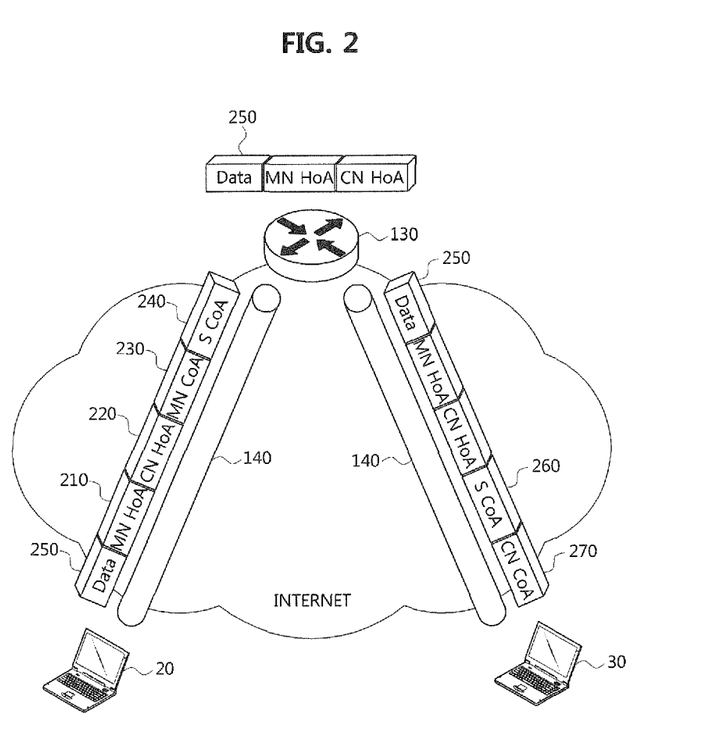
FIG. 2 is a conceptual diagram illustrating a method of processing traffic in a mobility support service.

FIG. 2 is a conceptual diagram illustrating a method of processing traffic in a mobility support service.

Referring to FIG. 2, a user terminal 20 and a correspondent terminal 30 may use respective active tunnels 140 to communicate with each other.

First, the user terminal 20, in order to transport data from a terminal address (MN HoA) 210 to a correspondent terminal address (CN HoA) 220, may use an address CoA that is used in the Internet network.

That is, the user terminal 20, in order to transport data 250, may designate a tunnel address (CoA) that is set on the Internet, as a source address (MN CoA) 230 of the data 250 and a destination address (S CoA) 240 of the data 250. And then the data 250 is sent to the mobility convergence control server 130 according to the tunnel address (CoA).

Upon completing reception of the data from the user terminal 20, the mobility convergence control server 130 discards the source address (MNCoA) 230 and the destination address (S CoA) 240, thereby acquiring the data of the user terminal 20.

Thereafter, the mobility convergence control server 130 may send the data 250 to the correspondent terminal 30 of which address is based on the correspondent terminal address 220 included in the acquired data 250. In this case, the mobility convergence control server 130 may transport the data 250 by setting an address of the mobility convergence control server 130 as a source address 260, and making a tunnel to a designation address 270 corresponding to the correspondent terminal 30.

Figure 3:
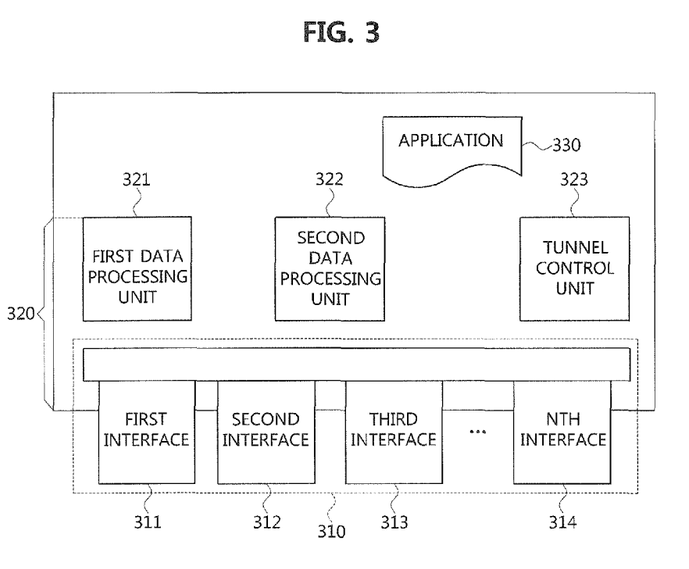
FIG. 3 is a block diagram illustrating a terminal that supports a mobility support service using multiple interfaces.

FIG. 3 is a block diagram illustrating a terminal that supports a mobility support service using multiple interfaces.

Referring FIG. 3, a terminal for a mobility support service may include multiple interfaces 310, an interface control unit (Kernel) 320, and an application 330.

The multiple interfaces 310 of the terminal may include a first interface 311, a second interface 312, a third first interface 313, . . . and an $n^{th}$ interface 314. In addition, the interface control unit 320 may include a first data processing unit 321, a second data processing unit 322, and a tunnel control unit 323.

The following description will be made on the assumption that the first data processing unit 321 processes Internet Protocol Version 4 (IPv4) data, and the second data processing unit 322 processes Internet Protocol Version 6 (IPv6) data. In addition, the tunnel control unit 323 processes a header of a tunnel.

Figure 4:
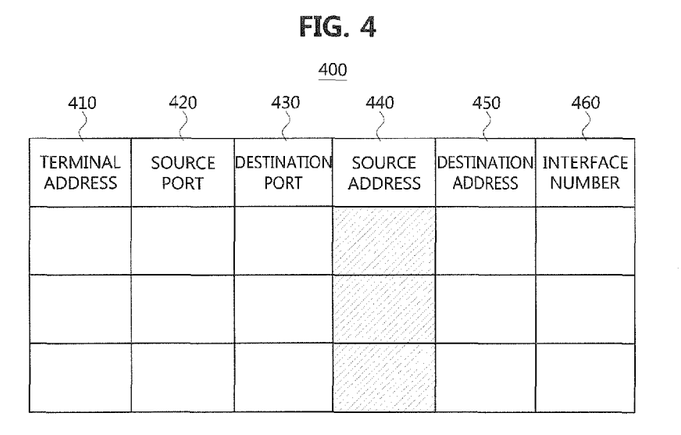
FIG. 4 is a conceptual diagram illustrating tunnel management information for a mobility support service using multiple interfaces.

FIG. 4 is a conceptual diagram illustrating tunnel management information for a mobility support service.

Referring to FIG. 4, the tunnel control unit 323 may include tunnel management information 400 for the mobility support service.

The tunnel management information 400 may include a terminal address 410, a source port 420, a destination port 430, a source address 440, a destination address 450, and an interface number 460.

A tunnel established with a terminal may map the tunnel management information 400 with respect to the terminal address (MN HoA). In this case, the tunnel established with the terminal may use a Transmission Control Protocol (TCP)/User Datagram Protocol (UDP) depending on security requirement. That is, the source port 420, the destination port 430, the source address 440, and the destination address 450 for TCP/UDP may be mapped to an actual interface number 460.

In addition, the terminal may manage active tunnel information and standby tunnel information through the tunnel management information 400.

Figure 5:
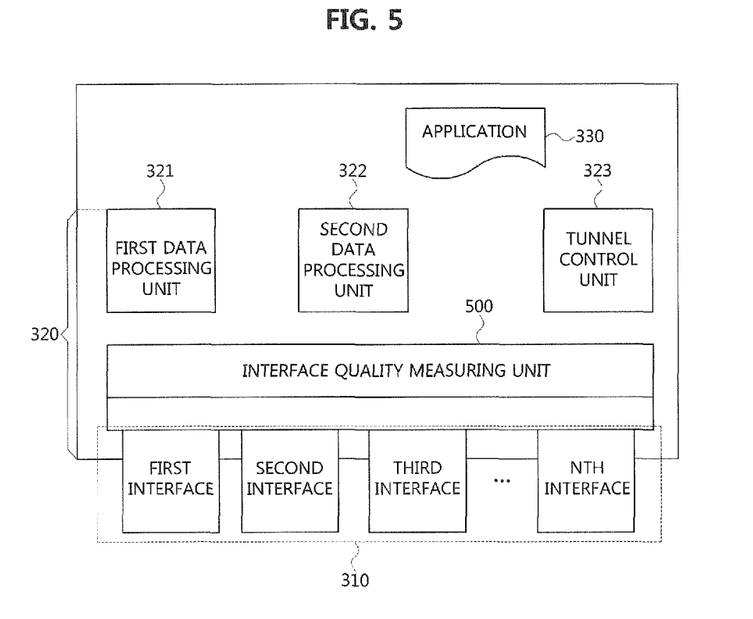
FIG. 5 is a block diagram illustrating an apparatus for balancing loads by using multiple interfaces in accordance with an exemplary embodiment of the present invention.

FIG. 5 is a block diagram illustrating an apparatus for balancing loads by using multiple interfaces in accordance with an exemplary embodiment of the present invention.

Referring to FIG. 5, a mobility support service terminal for balancing loads of multiple interfaces includes the multiple interfaces 310, the interface control unit (Kernel) 320, the application 330, and an interface quality measuring unit 500.

The configurations and functions of the multiple interfaces 310, the interface control unit 320, and the application 330 may be identical to those described with reference to FIG. 3.

That is, the multiple interfaces 310 of the terminal may include the first interface 311, the second interface 312, the third first interface 313, . . . and the $n^{th}$ interface 314. In addition, the interface control unit 320 may include the first data processing unit 321, the second data processing unit 322, and the tunnel control unit 323.

For example, the first data processing unit 321 may process IPv4 data, and the second data processing unit 322 may process IPv6 data. In addition, the tunnel control unit 323 of the terminal may process a header of a tunnel.

The interface quality measuring unit 500 of the terminal may measure statuses and qualities of the multiple interfaces 310 supported by the terminal.

In detail, the interface quality measuring unit 500 of the terminal may measure a status and a quality of each communication interface based on a signal strength (SS), a round trip time (RTT), and a transfer weight value of the communication interface.

The signal strength of the communication interface, which is different depending on the type of the wireless communication interfaces, may be converted into a percentage in the measurement.

In addition, the RITs of the communication interfaces may be obtained by calculating an RTT between each communication interface and the mobility convergence control server, and applying the calculated RTTs relative to the fastest RTT to the respective communication interfaces.

In addition, the transfer weight value of the communication interface may represent a maximum transport speed of the communication interface, and may represent a ratio relative to a transport speed of a wired communication interface that is assumed to '100'.

Figure 6:
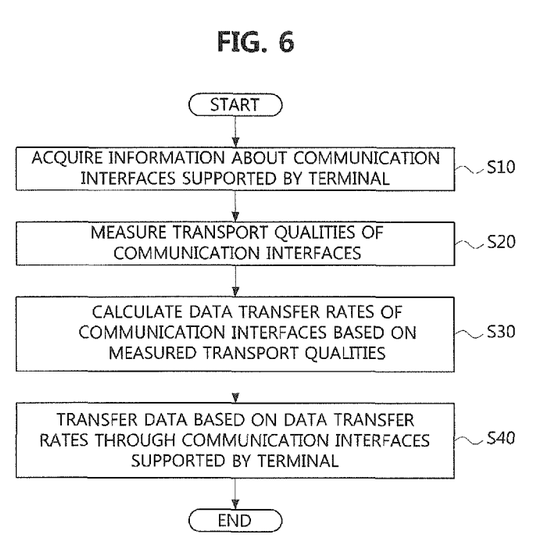
FIG. 6 is a flowchart showing a method of balancing loads by using multiple interfaces in accordance with an exemplary embodiment of the present invention.

FIG. 6 is a flowchart showing a method of balancing loads by using multiple interfaces in accordance with an exemplary embodiment of the present invention.

Referring to FIG. 6, a terminal may acquire information about communication interfaces supported by the terminal (S10).

The communication interfaces supported by the terminal may represent different types of network devices, for example, Ethernet, 2G, 3G, Wimax, and LTE, that allows the terminal to access a public network.

Thereafter, the terminal may measure transport qualities of the communication interfaces supported by the terminal (S20).

Figure 7:
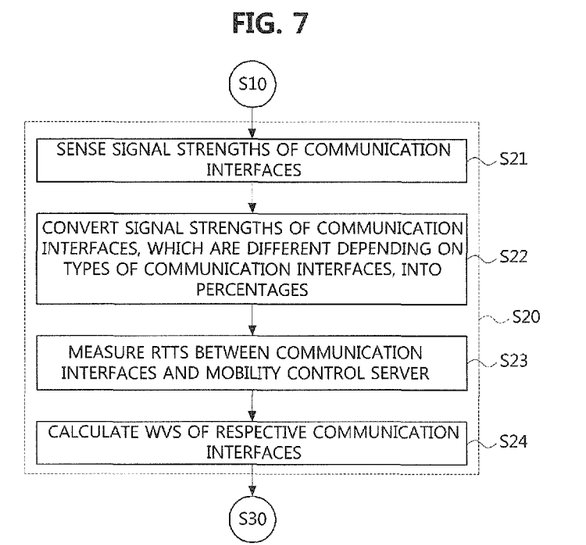
FIG. 7 is a flowchart showing an operation of measuring a quality of a communication interface shown in FIG. 6.

Referring to FIG. 7, operation S20 of the terminal measuring transport qualities of the communication interfaces will be described in detail.

FIG. 7 is a flowchart showing an operation of measuring qualities of communication interfaces shown in FIG. 6.

Referring to FIG. 7, the terminal may sense signal strengths (SS) of the communication interfaces supported by the terminal, the signal strengths being acquired in operation S10 (S21).

The signal strengths of the communication interfaces may be different depending on the type the communication interfaces. Accordingly, the terminal may convert signal strengths of the communication interfaces, which are different depending on the types of the wireless communication interfaces, into percentages (S22).

Thereafter, the terminal may measure round trip times (RTT) between the communication interfaces and the mobility convergence control server (S23).

The terminal may use relative values of RTTs of respective communication interfaces, supported by the terminal, to the fastest RTT of one communication interface of the communication interfaces as the RTTs for the respective communication interfaces.

For example, when it is assumed that a terminal supports three communication interfaces and RTTs of the communication interfaces are 1 sec, 2 secs, and 3 secs, respectively, an RTT of 3 secs of a certain communication interface may be set to '100', and an RTT of 2 sees of a communication interface may be set to '66'.

Thereafter, the terminal may calculate transfer weight values (WV) of respective communication interfaces (S24).

The terminal may determine transfer weight values of communication interfaces supported by the terminal as ratios of maximum transport speeds of the communication interfaces, and the transfer weight values may be determined as values relative to a transport speed of a wired communication interface that is assumed as '100'.

Referring again to FIG. 6, the terminal may calculate transfer rates of communication interfaces based on the measured transport qualities of the communication interfaces (S30).

The transport quality of the communication interface may represent the signal strength SS, the signal round trip time RTT, and the transfer weight value WV that are acquired through operations S21 to S24.

In detail, the transfer rate of the communication interface may be calculated based on Equation 1 below.

$$Q_i = (SS_i + RTT_i) \times CT_i \qquad \text{[Equation 1]}$$

In Equation 1, $Q_i$ represents a transfer rate of a communication interface i, $SS_i$ is a signal strength (SS) of a communication interface i, $RTT_i$ is a signal round trip time (RTT) of a communication interface i, and $CT_i$ is a transfer weight value (WV) of a communication interface i.

In this manner, the terminal according to an exemplary embodiment of the present application can periodically calculate transfer rates of a plurality of wireless communication interfaces supported by the terminal.

The terminal, when the data transfer rates of the communication interfaces are calculated, may establish a tunnel to the mobility convergence control server. The tunnel may be established as an active tunnel or a standby tunnel.

The terminal may establish a single active tunnel through a communication interface having the highest data transfer rate. In addition, the terminal may establish, as standby tunnels, the remaining communication interfaces except for the communication interface used to for the active tunnel among a plurality of communication interfaces supported by the terminal.

Thereafter, the terminal may transfer data based on data transfer rates through the communication interfaces supported by the terminal (S40).

The following description will be made on load balancing methods using multiple interfaces in accordance with exemplary embodiments of the present invention with reference to FIGS. 8 to 13, the load balancing methods using a transport scheme based on a packet to be transported by a client, a transport scheme based on a transport packet for each service flow, and a transfer scheme for transporting all packets divided to match the transfer rates, respectively.

Figure 8:
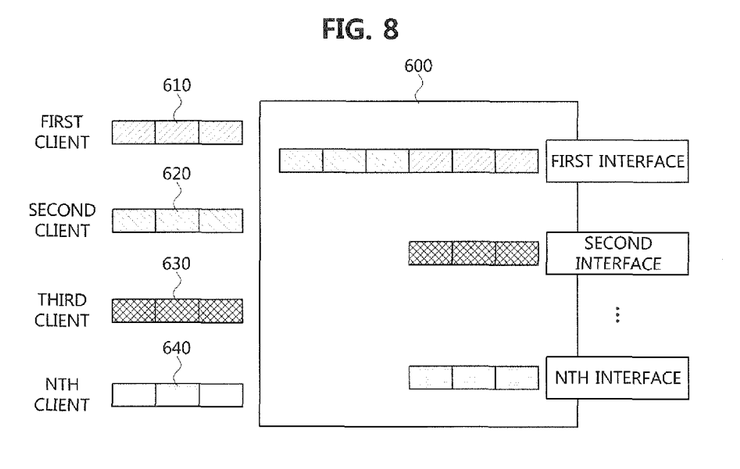
FIG. 8 is a conceptual diagram illustrating a transport scheme based on a packet to be transported by a client in a method of balancing loads by using multiple interfaces in accordance with an exemplary embodiment of the present invention.

FIG. 8 is a conceptual diagram illustrating a transport scheme based on a packet to be transported by a client in a method of balancing loads using multiple interfaces in accordance with an exemplary embodiment of the present invention.

Referring to FIG. 8, a terminal may determine communication interfaces to transport a packet 610 of a first client, a packet 620 of a second client, a packet 630 of a third client, and a packet 640 of an $n^{th}$ client, respectively, such that the determined communication interfaces match data transfer rates of the communication interfaces.

For example, when it is calculated that a first interface among a plurality of communication interfaces supported by the terminal has a highest data transfer rate, the terminal may determine the first interface to transport the packet 610 of the first client and the packet 620 of the second client.

In addition, the terminal may determine a second interface and an $n^{th}$ interface, whose data transfer rates are lower than that of the first interface, to transport the packet 630 of the third client and the packet 640 of the $n^{th}$ client, respectively.

Figure 9:
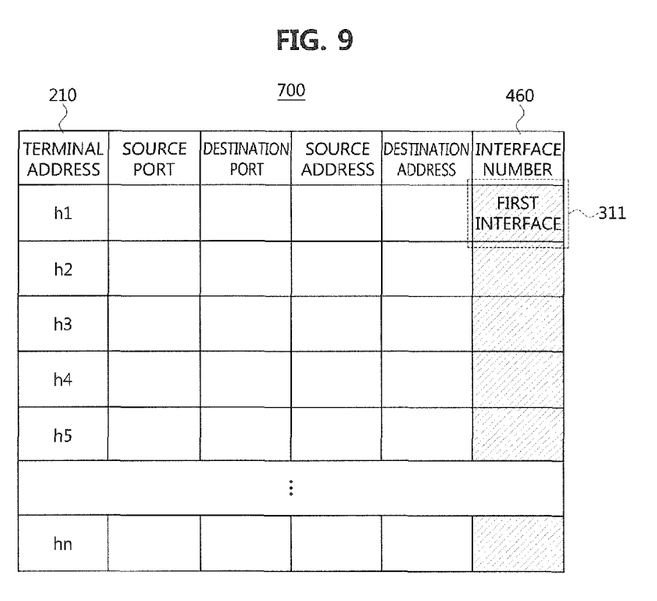
FIG. 9 is a conceptual diagram illustrating tunnel management information used in a transport scheme based on a packet to be transported by a client shown in FIG. 8.

FIG. 9 is a conceptual diagram illustrating tunnel management information used in a transport scheme based on a packet to be transported by a client shown in FIG. 8.

Referring to FIG. 9, tunnel management information 700 may include a terminal to address 210, a source port, a destination port, a source address, a destination address, and a interface number 460.

A terminal may set the communication interface 460, in which data transfer is actually performed, in the tunnel management information 700 about an established tunnel in addition to tunnel information. In this case, a source address of the tunnel may be set as an assigned address of the interface number 460. For example, as shown in FIG. 9, data of a terminal having a terminal address 'h1' is set to be transported through the first interface 311, and a source address of the tunnel may be set as an address of the first interface 311 that is assigned to the terminal.

Figure 10:
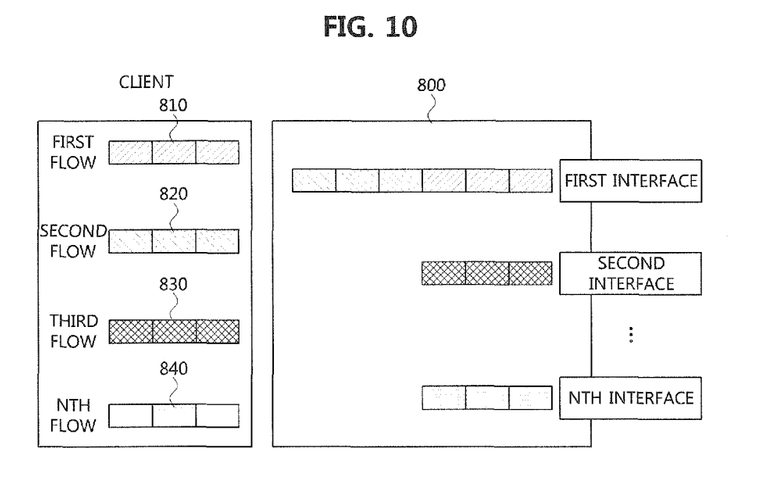
FIG. 10 is a conceptual diagram illustrating a transport scheme based on a transport packet for each service flow in a method of balancing loads by using multiple interfaces in accordance with an exemplary embodiment of the present invention.

FIG. 10 is a conceptual diagram illustrating a transport scheme based on a transport packet for each service flow in a method of balancing loads using multiple interfaces in accordance with an exemplary embodiment of the present invention.

Referring to FIG. 10, a terminal may determine communication interfaces to transport a first flow packet 810 of a client, a second flow packet 820 of the client, a third flow packet 830 of the client, and an $n^{th}$ flow packet 840 of the client, respectively, such that the determined communication interfaces match data transfer rates of the communication interfaces.

For example, when it is calculated that a first interface among a plurality of communication interfaces supported by the terminal has a highest data transfer rate, the terminal may determine to transport the first flow packet 810 and the second flow packet 820 through the first interface.

In addition, the terminal may determine to transport the third flow packet 830 and the $n^{th}$ flow packet 840 through a second interface and an $n^{th}$ interface, whose data transfer rates are lower than that of the first interface, respectively.

Figure 11:
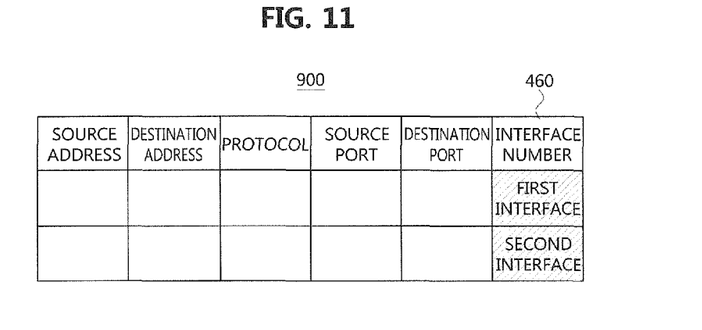
FIG. 11 is a conceptual diagram illustrating tunnel management information used in a transport scheme based on a packet for each service flow shown in FIG. 10.

FIG. 11 is a conceptual diagram illustrating tunnel management information used in a transport scheme based on a packet for each service flow of FIG. 10.

Referring to FIG. 11, tunnel management information 900 may include a source address, a destination address, a protocol, a source port, a destination port, and a interface number 460.

A flow represents the minimum unit in which a service is identified. For example, when a terminal accesses the same server through different two web browsers of the terminal, different two flows are generated. The terminal may distinguish the different flows based on a source address (a terminal address), a destination address (a server address), a destination port (a server port), a source port (a client port), and protocol (TCP/UDP) information that are included in the tunnel management information 900. In this case, since information about the source port in the tunnel management information 900 is differently set for each browser, the terminal is able to recognize the different flows.

As described above, the terminal may recognize the different flows, and determine the communication interfaces 460 used to transport data corresponding to the flows such that the determined communication interfaces match data transfer rates of the respective communication interfaces.

Figure 12:
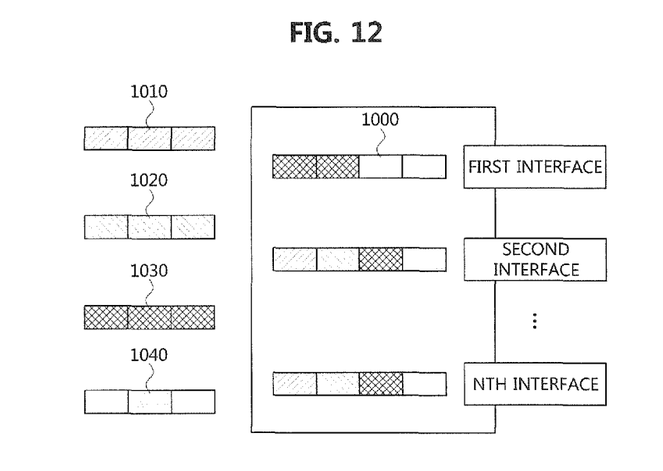
FIG. 12 is a conceptual diagram illustrating a method of balancing loads based on a packet in a method of balancing loads by using multiple interfaces in accordance with an exemplary embodiment of the present invention.

FIG. 12 is a conceptual diagram illustrating a transport scheme in which all packets are transported while divided based on the transfer rates in a method for load balancing using multiple interfaces in accordance with an exemplary embodiment of the present invention.

Referring to FIG. 12, a terminal may determine communication interfaces to transport all packets 1010, 1020, 1030, and 1040 such that the determined communication interfaces match data transfer rates of the respective communication interfaces.

For example, it may be assumed that the number of all packets 1010, 1020, 1030, and 1040 transported by a terminal is 12, and communication interfaces supported by the terminal include a first interface, a second interface, and an $n^{th}$ interface.

When data transfer rates of the first interface, the second interface, and the nth interface are calculated as the same, the total number of all the packets, that is, 12 is divided by 3, and thus the terminal determines to transport four packets through each of the communication interfaces.

Figure 13:
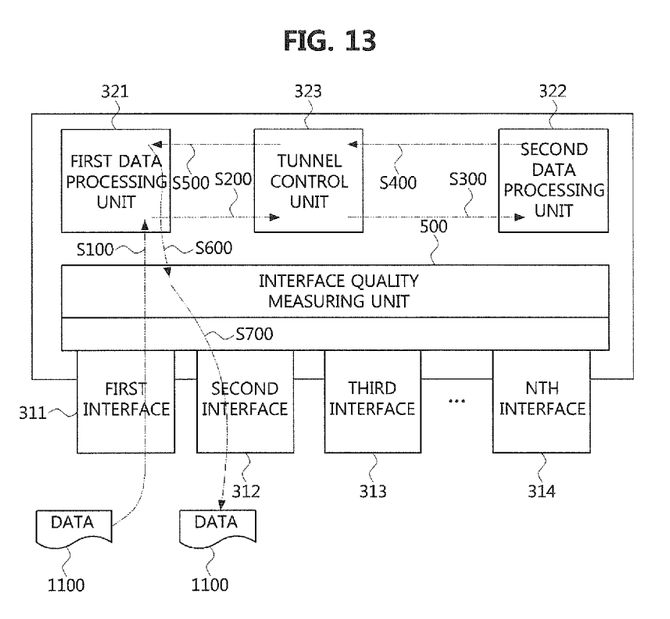
FIG. 13 is a conceptual diagram illustrating processing of data in a method of balancing loads based on a packet shown in FIG. 12.

FIG. 13 is a conceptual diagram illustrating processing of data in a method for load balancing based on a packet shown in FIG. 12.

Referring to FIG. 13, first, the terminal may receive an input of data 1100 through the first interface 311 among the plurality of communication interfaces supported by the terminal (S100).

Thereafter, the terminal may determine to release a tunnel through the first data processing unit 321. For example, the first data processing unit 321 may be composed of a module capable of processing IPv4 data.

Thereafter, the terminal may release a tunnel of the data 1100 through the tunnel control unit 322 (S200).

Thereafter, after releasing the tunnel of the data 1100 through the tunnel control unit 323, the terminal may process internal data through the second data processing unit 322 (S300).

For example, when it is assumed that an address of a correspondent terminal, for which the data 1100 is destined, is IPv6, the second data processing unit 322 may be composed of a module capable of processing IPv6 data.

Thereafter, the terminal may transport the data 1100 to the tunnel control unit 323 so as to transport the data 1100 to the correspondent terminal, and the tunnel control unit 323 may reset tunnel information based on tunnel information (S400).

For example, the tunnel information may represent a source address and a destination address.

Thereafter, the terminal may transport the data 1100, whose tunnel information is reset, to the first data processing unit 321 (S500).

Thereafter, the terminal may transport the data 1100, whose tunnel information is reset in control unit 323, to the interface quality measuring unit 500 via the first data processing unit 321.

Thereafter, the terminal may determine a communication interface used to transport the data 1100 such that respective communication interfaces match data transfer rates of the respective communication interfaces measured through the interface quality measuring unit 500.

Accordingly, the terminal may determine, through the interface quality measuring unit 500, the second interface 312 as the communication interface to transport the data 1100, and may transport the data 1100 through the determined second interface 312.

Figure 14:
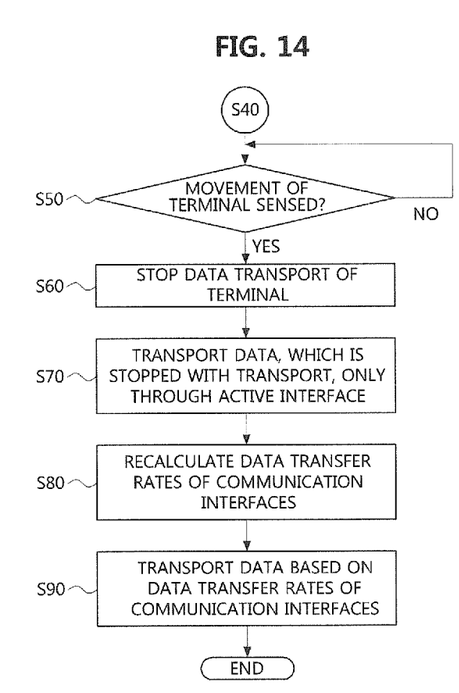
FIG. 14 is a flowchart showing a case in which a movement of a terminal is sensed in a method of balancing loads by using multiple interfaces in accordance with an exemplary embodiment of the present invention.

FIG. 14 is a flowchart showing a case in which a movement of a terminal is sensed in a method for load balancing using multiple interfaces in accordance with an exemplary embodiment of the present invention.

Referring to FIG. 14, the terminal determines whether a movement of the terminal is sensed, while transporting data based on data transfer rates as described in operation S40 with reference to FIG. 6 (S50).

Here, the terminal may sense mobility of the terminal based on change in transport quality of an active interface or standby interfaces that is set to a mobility convergence control server.

The terminal, if it is failed to sense the mobility in operation S50, keeps determining whether a movement of the terminal is sensed.

On the other hand, if the mobility is sensed in operation S50, the terminal stops the data transport having been performed through a plurality of communication interfaces (for example, an active interface and standby interfaces) (S60).

Thereafter, the terminal may transport the data, which is stopped with transport, only through a predetermined active interface (S70).

That is, the terminal may transport all the data, which have been transported through an active interface and standby interfaces, only using the active interface.

Thereafter, the terminal, after the data transfer is completed, may recalculate the transfer rates of data transported through the plurality of interfaces supported by the terminal (S80).

The terminal may measure the transport qualities of the plurality of communication interfaces supported by the terminal again as described with reference to FIGS. 6 and 7, and recalculate the transfer rates of data transported through the respective communication interfaces based on the measured transport qualities.

Thereafter, the terminal may transport data based on the recalculated data transfer rates through the plurality of communication interfaces (S90).

Figure 15:
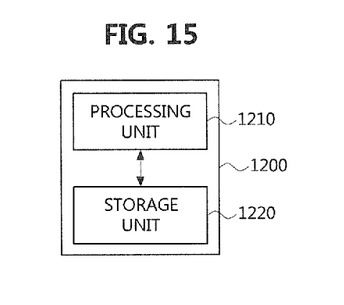
FIG. 15 is a block diagram illustrating an apparatus for balancing loads by using multiple interfaces in accordance with an exemplary embodiment of the present invention.

FIG. 15 is a block diagram illustrating an apparatus for load balancing using multiple interfaces in accordance with an exemplary embodiment of the present invention.

Referring to FIG. 15, an apparatus for load balancing using multiple interfaces 1200 may perform the method for load balancing using multiple interfaces described with references to FIGS. 6 to 14.

The load balancing apparatus 1200 may include a processing unit 1210 and a storage unit 1220.

The processing unit 1210 may include multiple interfaces, an interface control unit, an application, and an interface quality measuring unit.

The multiple interfaces may include a plurality of wireless communication interfaces. In addition, the interface control unit may include a first data processing unit to process IPv4 data, a second data processing unit to process IPv6 data, and a tunnel control unit.

The interface quality measuring unit may measure statuses and qualities of the plurality of wireless communication interfaces supported by the terminal.

The processing unit 1210 may include a processor and a memory. The processor may represent a common processor, such as a central processing unit (CPU) or a dedicated processor designed for the method for load balancing using multiple interfaces. The memory may store program codes for the method for load balancing using multiple interfaces. That is, the processor may read the program code stored in the memory, and based on the read program code, perform each operation of the method for load balancing using multiple interfaces.

The storage unit 1220 may store information having been processed in the processing unit 1210 and information to be processed in the processing unit 1210. For example, the storage unit 1220 may store information about a plurality of wireless communication interfaces supported by the apparatus for load balancing, signal strengths of the respective wireless communication interfaces, RTTs of the respective wireless communication interfaces, and transfer weight values of the respective wireless communication interfaces.

As is apparent from the above, the method and apparatus for balancing loads of multiple interfaces for a mobility support service can improve efficiency in the network use by measuring qualities of multiple interfaces and balancing loads on data transport.

In addition, loads can be balanced by using multiple interfaces in an environment in which a plurality of users share a network, for example, in an environment, such as a vehicle, vessel, and air craft, on which a mobile router may be installed.

While the example embodiments of the present invention and their advantages have been described in detail, it should be understood that various changes, substitutions, and alterations may be made herein without departing from the scope of the invention.

What is claimed is:

1. A method for load balancing by using multiple interfaces, which is performed by a terminal, the method comprising:
    acquiring information about a plurality of wireless communication interfaces supported by the terminal;
    measuring transport qualities of the plurality of wireless communication interfaces;
    calculating data transfer rates of the plurality of wireless communication interfaces based on the transport qualities;
    determining a wireless communication interface having a highest transfer rate among the wireless communication interfaces as an active interface;
    determining wireless communication interfaces except for the active interface as standby interfaces;
    simultaneously transporting the data through the determined active interface and the determined standby interfaces;
    stopping, if a movement of the terminal is sensed, transporting the data;
    transporting data which has been stopped with the transport, only through the active interface; and
    recalculating the data transfer rates of the wireless communication interfaces.

2. The method of claim 1, wherein the transport quality is determined based on a signal strength, a round trip time, and a transfer weight value of the wireless communication interface.

3. The method of claim 2, wherein the signal strength is determined by converting the signal strength, which is different depending on the type of the wireless communication interface, into a percentage.

4. The method of claim 2, wherein the transfer weight value is determined based on a ratio of a maximum transport speed of the wireless communication interface to a transport speed of a wired communication interface.

5. The method of claim 1, wherein the simultaneously transporting of data based on the transfer rates comprises:

determining one of a transport scheme based on a packet to be transported by a client, a transport scheme based on a transport packet for each service flow, and a transport scheme in which all packets are transported while divided based on the transfer rates;

determining wireless communication interfaces to transport the data, based on the determined transport scheme and the data transfer rates; and simultaneously transporting the data through the determined wireless communication interfaces.

6. The method of claim 5, wherein in the determining of the wireless communication interfaces to transport the data, if the transport scheme based on a packet to be transported by a client is determined, the wireless communication interfaces to transport packets to be transported by respective clients are determined to match the data transfer rates.

7. The method of claim 5, wherein in the determining of the wireless communication interfaces to transport the data, if the transport scheme based on the transport packet for each service flow is determined, the wireless communication interfaces to transport packets for respective service flows are determined to match the data transfer rates.

8. The method of claim 5, wherein in the determining of the wireless communication interfaces to transport the data, if the transport scheme in which all packets are transported while divided based on the transfer rates is determined, the wireless communication interfaces to transport the all packets are determined to match the data transfer rates.

9. An apparatus for balancing loads by using multiple interfaces, the apparatus comprising:

a processor, wherein the processor acquires information about a plurality of wireless communication interfaces supported by the load balancing apparatus, measure transport qualities of the plurality of wireless communication interfaces, calculate data transfer rates of the plurality of wireless communication interfaces based on the transport qualities, determines a wireless communication interface having a highest transfer rate among the wireless communication interfaces as an active interface, determines wireless communication interfaces except for the active interface as standby interfaces, and simultaneously transports the data through the determined active interface and the determined standby interfaces; and a storage, wherein the storage stores information having been processed by the processor and information to be processed by the processor, wherein the processor stops, if a movement of the terminal is sensed, transporting the data, transports data, which has been stopped with the transport, only through the active interface, and recalculates the data transfer rates of the wireless communication interfaces.

10. The apparatus of claim 9, wherein the transport quality is determined based on a signal strength, a round trip time, and a transfer weight value of the wireless communication interface.

11. The apparatus of claim 10, wherein the signal strength is determined by converting the signal strength, which is different depending on a type of the wireless communication interface, into a percentage.

12. The apparatus of claim 10, wherein the transfer weight value is determined based on a ratio of a maximum transport speed of the wireless communication interface to a transport speed of a wired communication interface.

13. The apparatus of claim 9, wherein the processor determines one of a transport scheme based on a packet to be transported by a client, a transport scheme based on a transport packet for each service flow, and a transport scheme in which all packets are transported while divided based on the transfer rates; determines wireless communication interfaces to transport the data, based on the determined transport scheme and the data transfer rates; and simultaneously transports the data through the determined wireless communication interfaces.

14. The apparatus of claim 13, wherein the processor determines, if the transport scheme based on a packet to be transported by a client is determined, the wireless communication interfaces to transport packets to be transported by respective clients to match the data transfer rates.

15. The apparatus of claim 13, wherein the processor determines, if the transport scheme based on the transport packet for each service flow is determined, the wireless communication interfaces to transport packets for respective service flows to match the data transfer rates.

16. The apparatus of claim 13, wherein the processor determines, if the transport scheme in which all packets are transported while divided based on the transfer rates is determined, the wireless communication interfaces used to transport the all packets to match the data transfer rates.

* * * * *